(12) United States Patent
Andersen

(10) Patent No.: US 7,982,325 B2
(45) Date of Patent: Jul. 19, 2011

(54) WIND POWER INSTALLATION AND METHOD OF OPERATING IT

(75) Inventor: Bjorn Andersen, Oestbirk (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 278 days.

(21) Appl. No.: 12/332,467

(22) Filed: Dec. 11, 2008

(65) Prior Publication Data
US 2009/0167021 A1      Jul. 2, 2009

(30) Foreign Application Priority Data

Dec. 27, 2007  (ES) ................................. 200703458

(51) Int. Cl.
*F03D 9/00*       (2006.01)
(52) U.S. Cl. .............................. 290/44; 290/43; 290/55
(58) Field of Classification Search .................... 290/44, 290/43, 55
See application file for complete search history.

(56) References Cited

U.S. PATENT DOCUMENTS

| | | | | |
|---|---|---|---|---|
| 5,247,234 A * | 9/1993 | Bitzer et al. | .................. | 318/603 |
| 6,219,623 B1 * | 4/2001 | Wills | .............................. | 702/60 |
| 6,891,281 B2 * | 5/2005 | Wobben | .......................... | 290/44 |
| 7,239,036 B2 * | 7/2007 | D'Atre et al. | .................. | 290/44 |
| 7,312,537 B1 * | 12/2007 | Walling et al. | .................. | 290/44 |
| 7,345,373 B2 * | 3/2008 | Delmerico et al. | ............. | 290/44 |
| 7,397,143 B2 * | 7/2008 | Walling | .......................... | 290/44 |

* cited by examiner

*Primary Examiner* — T C Patel
*Assistant Examiner* — Iraj A Mohandesi
(74) *Attorney, Agent, or Firm* — Ladas & Parry LLP

(57) ABSTRACT

The purpose of the invention is to reduce the contribution of wind power installations to frequency errors on the grid, and preferably to contribute to the elimination of such errors. Thus, the method involves the use of PID control and/or control with hysteresis so as to regulate the active power injected into the grid, in view of the deviation between a measured grid frequency and the nominal grid frequency.

17 Claims, 7 Drawing Sheets

WIND POWER INSTALLATION AND METHOD OF OPERATING IT

FIELD OF THE INVENTION

The present invention relates to the field of wind energy systems and devices, and more specifically to the control of the way power generated by such systems and devices is supplied to a network or grid for distribution of the power.

STATE OF THE ART

Wind energy systems and installations include one or more wind power generators or turbines arranged to produce electrical energy by rotation induced by the wind. This electrical energy, generated by one or more of these generators (for example, by several generators forming part of or constituting a so-called "wind farm"), is supplied to a grid or network for distribution of the energy. Normally, a large number of electrical power generators are connected to the same grid, and normally several power consumers are also connected to the grid.

In order to maintain the voltage and frequency on the network substantially constant, it is important that the power input to the grid at each moment substantially equals the power that is consumed. Thus, generation of power (including the power generated by the individual generators or wind turbines and/or by one or more wind farms considered as a whole) has to be controlled and modified in accordance with the consumption.

A problem with wind energy, in comparison with other types of electrical power generation such as hydroelectric power generation, nuclear power, etc., is that the wind tends to fluctuate a lot also in the short term. If the wind power only represents a very small proportion of the power that is input to a network, these variations may not be very relevant for the general performance of the network. However, as wind power has increased in popularity and now makes up a substantial part of the total electrical power that is injected into the network, regulation of the way in which wind power is injected and supplied to the grid (by individual wind turbines and/or by the wind farms considered as a whole) has become increasingly important. A large number of patents, patent applications and other documents teach different ways of controlling the supply of wind power to the network.

One example of such a patent application is DE-A1-102005052011 (E.ON Netz GmbH), which describes how the active power injected into the grid from a wind power installation is varied according to a specified formula, related to the frequency on the network. Normally, a network is arranged to operate at a pre-established frequency, for example, in practice, 50 Hz or 60 Hz. In order to keep the actual network frequency at this nominal frequency, the injection of power into the network should equal the consumption. When more active power is consumed than what is injected into the network, the instantaneous or actual network frequency tends to sink. When more active power is injected into the network than what is consumed, the actual network frequency tends to rise. The networks or grids, as well as the apparatus and installations connected to them for injection and/or consumption of active power, are normally designed to tolerate minor deviations from the nominal frequency. However, substantial deviations can have negative effects on the operation of the network and on the devices connected to the network.

As wind power is becoming an important energy source and as the power generated by wind turbines that is injected into the network is becoming an important part of the total active power injected into the network, it is important to control wind power installations so that they contribute to the stability of the grid or, at least, so that they contribute as little as possible to the instability of the grid.

As mentioned in DE-A1-102005052011, a previous application, DE-A1-10022974 (Aloys Wobben) already proposed a reduction of the active power when the actual network frequency increased beyond a network frequency limit that was 0.3% above the nominal network frequency. Also, DE-A1-10022974 disclosed that no power should be injected into the network when the actual network frequency was 2% above the nominal network frequency. A controller was mentioned, but it was not disclosed exactly how it should operate.

DE-A1-102005052011 proposes that when the actual network voltage increases beyond 50.2 Hz, the active power should be dynamically reduced in accordance with the formula $$\Delta P = 20\, P_M [(50.2\, \text{Hz} - f_{grid})]/50\, \text{Hz},$$

wherein $\Delta P$ is the reduction in the injected active power P in %, $P_M$ is the active power that currently is injected into the grid, and $f_{grid}$ is the current network frequency.

It is stated that the regulation takes place only within a frequency range from 50.2 Hz and up to and including 51.5 Hz. Further, it is suggested that the wind power generator is to be automatically disconnected from the grid when the actual network frequency decreases below a lower frequency limit of 47.5 Hz and/or increases beyond an upper frequency limit of 51.5 Hz, whereby said disconnection should be a "physical" disconnection. It is stated that in this way, there is no risk that the generator remains connected to the network when the actual network frequency reaches values outside the above-mentioned range of 47.5 Hz-51.5 Hz.

DESCRIPTION OF THE INVENTION

However, it has been found that if it is assumed that "reconnection" is to take place again as soon as the actual network frequency returns within said frequency range of 47.5 Hz-51.5 Hz, problems could occur. For example, if "reconnection" of a wind power installation takes place as soon as the measured or actual network frequency sinks from "just above" 51.5 Hz to 51.5 Hz, this reconnection, and the corresponding injection of more active power into the grid, could "push" the actual network frequency back beyond 51.5 Hz, which could force a new disconnection of the installation from the grid. The risk that the "reconnection" will have this effect is obviously greater when the installation has a high power capacity in relation to the total power injected into the grid, for example, if the installation comprises a large capacity wind power generator and/or a large number of wind power generators (such as if the installation is a wind park), or if several installations are operated in accordance with the same "criteria" for disconnection, in which case they may reconnect at the same time. If so, an oscillating state could occur, in which the installations are repeatedly disconnected (as the frequency increases beyond the upper frequency limit) and reconnected (when the frequency once again sinks back to said upper frequency limit). This could give rise to a loop from which it could be difficult to exit.

Another problem is that the formula described above could indeed help to avoid or reduce a substantial further increase of the actual network frequency when the frequency reaches the limit of 50.2 Hz mentioned above, as any further increase will imply a reduction in the power injected into the network.

However, this simple "P" (proportional) control and open loop control would not appear to help to bring the actual network frequency back towards the nominal network frequency; it would merely help to stabilise it at some level beyond 50.2 Hz.

That is, basically, both DE-A1-102005052011 and DE-A1-10022974 mentioned above (as well as many known prior art "grid codes") are based on some kind of "P" (proportional) regulation or also on some open loop control with a fixed P-gain which may, at least in some cases, help to reduce the contribution of a wind power installation to a further increase of the actual network frequency, but which may be insufficient to bring the actual network frequency back towards the nominal network frequency. Maybe this is because it has traditionally been considered that the task of bringing the network frequency back towards the actual frequency is not a task that should be resolved with the aid of the wind power installations, but rather a task that should be handled by the system operator using other means, for example, by reducing the power generated by other power generators, typically by controlling the power generated by fast power plants with gas turbines (where the power output can be varied rapidly) or by hydroelectric power plants.

However, it has been found that also wind turbines can be controlled so as to modify their power output rapidly. Thus, it has been considered of interest to use this advantage of the wind turbine by using the controller of the wind turbines more actively.

Also, in view of the increasing proportion of the total active power injected into the grid that is produced by wind power installations, it has been considered that also the wind power installations should assist the network in actually bringing the actual network frequency back towards the nominal frequency, and that no "on/off" oscillation should take place in correspondence with the upper or lower frequency limits.

Thus, the invention as disclosed herein can be used to a) reduce the risk for on/off oscillations; and/or b) actively contribute to the stabilization of the grid frequency, and/or help to bring the grid frequency back to its "normal" or nominal value.

Thus, a first aspect of the invention relates to a method of operating a wind power installation connected to a network for distribution of electrical power, said wind power installation comprising at least one wind power generator (that is, the wind power installation can correspond to a single wind power generator or wind turbine, or to a group of them, such as a wind farm or a part of a wind farm), said wind power installation being related to said network for injection of power into said network (that is, for injection of active power and, optionally, of reactive power, at one or more points of interconnection between the wind power installation and the network), said network having a nominal network frequency ($f_n$) (for example, 50 Hz) and said network being arranged for operating at said nominal network frequency (normally, within a band around said nominal network frequency).

The method comprises controlling the active power that is injected into said network from said wind power installation in view of a measured actual network frequency ($f_a$) at which the network is operating. More specifically, the method comprises the steps of measuring said actual network frequency ($f_a$);

determining a difference (E) between said actual network frequency ($f_a$) and said nominal network frequency ($f_n$);

if said difference is larger than a predefined threshold (which can be 0 Hz or a higher value, such as, for example, 0.2 Hz), adapting (that is, increasing or decreasing) the amount of active power that is injected into the network from said wind power installation, in a manner so as to bring the actual network frequency ($f_a$) back towards the nominal network frequency ($f_n$).

In this way, it is achieved that the wind power installation actively contributes to stabilisation of the network by bringing the actual network frequency back towards the nominal network frequency (instead of, as suggested in prior art, merely adapting the amount of active power that is injected into the network so as to reduce the contribution to a further increase in the difference between the actual network frequency and the nominal network frequency).

Thus, contrarily to what happens in the systems disclosed in DE-A1-102005052011 and DE-A1-10022974 referred to above, the method of the present invention makes sure that the wind power installation not only reduces its contribution to an increased frequency error (that is, to an increased difference between the actual frequency and the nominal frequency), but also actively contributes to a reduction of said error.

For example, the formula $\Delta P = 20\, P_M\, [(50.2\, HZ - f_{grid})]/50\, Hz$ referred to in DE-A1-102005052011 represents a pure "P" (proportional) regulation, with a gain factor or P-factor of 0.4 (that is, 20/50). However, this pure P (proportional) control has the disadvantage that it does not remove the error, as in the absence of disturbances pure proportional control tends to retain a steady state error.

Contrarily, the present invention can involve an integral and/or derivative control component, that is, for example, PI, PD or PID regulation. These kinds of controllers are well-known to the person skilled in the art of control systems, and their use for the frequency control in accordance with the present invention has been found to be helpful for reducing the risk for and/or duration of frequency errors.

Basically, a proportional-integral-derivative controller (PID controller) can be considered to be a generic control loop feedback mechanism that serves to correct the error between a measured process variable and a desired setpoint by generating a corrective action that can adjust the process accordingly.

The PID control algorithm involves three different parameters or components, namely, the proportional (P), the integral (I) and the derivative (D) ones. The proportional part determines a reaction based on an instantaneously measured error (as taught in DE-A1-10022974 and DE-A1-102005052011 cited above). Now, the integral part determines the reaction based on the error integrated over a certain time period, that is, basically, based on the sum of a plurality of more or less recently measured error values (and is thus useful for avoiding the remaining steady state error mentioned above). On the other hand, the derivative part determines the reaction based on the rate at which the error has been changing recently. A weighted sum of these three components is used to adjust the process via a control element, that regulates the supply of active power to the grid.

By "tuning" the contribution of the three components in the PID controller algorithm, the PID can provide a control action designed for specific process requirements. The response of the controller can be described in terms of the responsiveness of the controller to an error, the degree to which the controller overshoots the setpoint and the degree of system oscillation.

Furthermore, some of the settings can be given by the system operator to ensure that wind power installations connected to a grid react to frequency changes in the manner desired by the system or grid operator. For example, if the system operator wants that every wind turbine or wind farm contributes to the frequency control in the same way, he can define a certain setting for the "I"-part (as this will modify the power reduction depending on the time duration of the error)

and/or for the "D"-part (as this will determine the power reduction depending on the rate of change in the network frequency).

Sometimes, only one or two of the three components is needed to provide the appropriate system control. This is achieved by disabling the undesired control components.

Thus, the active power that is injected into the network can, for example, be adapted using a controller involving at least an integration over time of said difference (E) between said actual network frequency ($f_a$) and said nominal network frequency ($f_n$). That is, at least the integral (I) component mentioned above could be applied. Thus, said controller can be a PI controller, a PID controller, an ID controller or a mere I controller.

The contribution from the integral term is proportional to both the magnitude of the error and the duration of the error. Thus, by summing the instantaneous error over time (that is, by integrating the error), an "accumulated offset" is determined. This accumulated offset is then multiplied by the integral gain of the controller and added to the controller output, in the known manner.

Thus, by using this integral term, the controller accelerates the movement towards the setpoint and eliminates the residual steady-state error that occurs with a "pure" proportional controller. Obviously, care must be taken when designing the control system so as not to (excessively) overshoot the setpoint, and to limit the output (the integral part will integrate until the error is zero, but if there is a continues error, the integral part will integrate all the time, which could give rise to serious problems if there is no limit imposed on the output from the controller).

As an alternative or complement, said active power that is injected into the network can be adapted using a controller involving at least a time derivative of said difference (E) between said actual network frequency ($f_a$) and said nominal network frequency ($f_n$). That is, the controller can be an ID controller or a PID controller (as mentioned above), or a D controller or a PD controller.

The derivative term reduces the rate of change of the controller output and this effect is most noticeable close to the controller setpoint. Hence, derivative control can be used to reduce the magnitude of the overshoot produced by the integral component and improve the combined controller-process stability. As the contribution of the derivative part depends directly on the rate of change, the corresponding power output reduction will depend substantially on the rate of change (df/dt) instead of (and/or in addition to) the absolute value of the frequency error. This can be a big advantage as the wind turbines with relative fast power output control (compared to many conventional power plants) can help to stabilize the grid frequency more rapidly by using a high "D" part. Thus, by using the "D" part the frequency error will not increase as much as in many prior art systems, as the system can be stabilized much faster. Thus, the "D" part can help to prevent large frequency errors.

Another aspect of the invention relates to a method of operating a wind power installation connected to a network for distribution of electrical power, said wind power installation comprising at least one wind power generator (that is, the wind power installation can correspond to a single wind power generator or wind turbine, or to a group of them, such as a wind farm or a part of a wind farm), said wind power installation being related or connected to said network for injection of power into said network (that is, for injection of active power and, optionally, of reactive power, at one or more points of interconnection between the wind power installation and the network), said network having a nominal network frequency ($f_n$) (for example, 50 Hz) and said network being arranged for operating at said nominal network frequency (normally, within a band around said nominal network frequency).

The method comprises controlling the active power that is injected into said network from said wind power installation in view of a measured actual network frequency ($f_a$) at which the network is operating. The method comprises the steps of
reducing the active power injected into the network, as a function of the actual network frequency (that is, in accordance with "rules" based on said actual network frequency—such as in accordance with "proportional" rules such as the formula referred to in DE-A1-102005052011 mentioned above, or in accordance with PID, PD, ID, PI, I or D "rules"—), if said actual network frequency increases above a first upper network frequency threshold value ($f_1$) (which could correspond to 50.2 Hz, as in DE-A1-102005052011, or to any other suitably selected value), and
stopping injection of active power into the network if said actual network frequency increases beyond a second upper network frequency threshold value ($f_2$) higher than said first upper frequency threshold value ($f_1$).

In accordance with this aspect of the invention, and once said actual network frequency has increased beyond said second upper network frequency threshold value ($f_2$) (this second upper network frequency threshold value ($f_2$) can, for example, be 51.5 Hz, in line with what is disclosed DE-A1-102005052011), injection of active power into the network is not resumed until the actual network frequency has decreased below a third upper frequency threshold value ($f_3$) lower than said second upper frequency threshold value ($f_2$) (and optionally or preferably higher than said first upper frequency threshold value ($f_1$)). That is, if $f_1$=50.2 Hz and $f_2$=51.5 Hz, $f_3$ could be set to a value slightly below 51.5 Hz, such as to 51.4 Hz, 51.3 Hz, 51.2 Hz or 51.0 Hz. By using this third upper frequency threshold value, it is achieved that injection of active power does not resume until the actual network frequency has decreased sufficiently below the second upper frequency threshold value to "guarantee" or at least make it likely that a restart of the injection of active power will not immediately "push" the network frequency upwards beyond the second upper frequency threshold value. Thus, "oscillations" in the on/off status of the injection of active power can be avoided, which can serve to increase the stability of the system. This kind of control system is robust and easy to implement.

The method can further comprise the steps of reducing the active power injected into the network as a function of the actual network frequency (that is, in accordance with "rules" based on said actual network frequency), if said actual network frequency decreases below a first lower network frequency threshold value ($f_4$) (which could correspond to, for example, 49.8 Hz), and stopping injection of active power into the network if said actual network frequency decreases below a second lower network frequency threshold value ($f_5$) lower than said first lower frequency threshold value ($f_4$). Further, once said actual network frequency has decreased below said second lower network frequency threshold value ($f_5$) (this second lower network frequency threshold value ($f_5$) can, for example, be 47.5 Hz), injection of active power into the network would not be resumed until the actual network frequency has increased beyond (that is, above) a third lower frequency threshold value ($f_6$) higher than said second lower frequency threshold value ($f_5$) (and optionally or preferably lower that said first lower frequency threshold value $f_4$)). Thus, "oscillations" in the on/off status of the injection of active power can be avoided or reduced also in the range of frequencies lower than the nominal network frequency, which can serve to further increase the stability of the system.

As an alternative, instead of reducing the amount of active power injected into the network as a function of the actual network frequency, if said actual network frequency decreases below the first lower network frequency threshold value ($f_4$), it is possible to increase the amount of active power injected into the system. This can help to further stabilize the network/grid (a frequency drop implies that more active power is consumed than what is injected into the grid, and a suitable response to a frequency drop can thus comprise increasing the amount of active power injected into the grid, when this is possible), but on the other hand it may require some kind of "power reserve" or "spinning reserve" in the wind power installation. Also here, the hysteresis function described above can be implemented, for example, so that no power or less power is injected into the grid when the actual frequency sinks below said second lower frequency threshold value ($f_5$) and so that power injection is resumed or increased again first when the actual network frequency increases above said third lower frequency threshold value ($f_6$).

This "hysteresis" function of the second aspect of the invention can be combined with the first aspect of the invention, so that the control (for example, PI, PD, PID, etc.) is initiated once the frequency increases beyond (decreases below) said first upper (lower) frequency threshold value, etc.

A third aspect of the invention relates to a wind power installation connected or arranged to be connected to a network for distribution of electrical power, said wind power installation comprising at least one wind power generator (that is, the wind power installation can correspond to a single wind power generator or wind turbine, or to a group of them, such as a wind farm or a part of a wind farm), said wind power installation being related (such as connected, for example, through one or more transformers) to said network for injection of power into said network (that is, for injection of active power and, optionally, of reactive power, at one or more points of interconnection between the wind power installation and the network). The wind power installation further comprises a controller or control system arranged for controlling the injection of active power into the network in accordance with the method of any of the aspects of the invention described above, or in accordance with both aspects of the invention.

BRIEF DESCRIPTION OF THE DRAWINGS

To complete the description and in order to provide for a better understanding of the invention, a set of drawings is provided. Said drawings form an integral part of the description and illustrate some preferred embodiments of the invention, which should not be interpreted as restricting the scope of the invention, but just as an example of how the invention can be embodied. The drawings comprise the following figures.

DESCRIPTION OF PREFERRED EMBODIMENTS OF THE INVENTION

Figure 1:
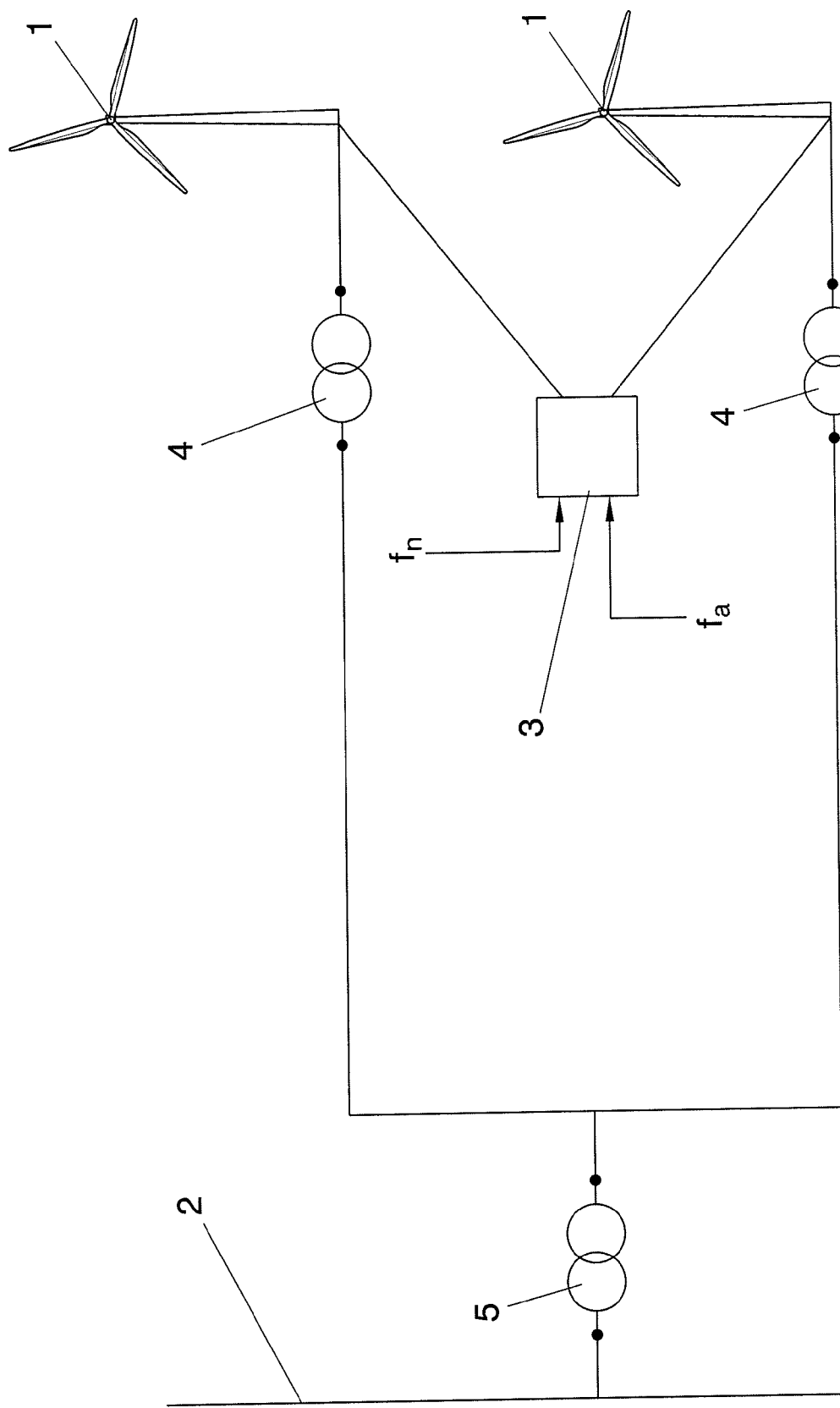
FIG. 1: A schematic illustration of a wind power installation connected to a network for power distribution.

FIG. 1 schematically illustrates a wind power installation comprising a plurality of wind turbines or wind power generators 1, each one of them being connected, by a first transformer 4, to a second transformer 5 by means of which the wind turbines 1 are connected to a grid or network 2 for distribution of electrical power to a plurality of consumers (not illustrated) connected to the network. Conventionally, also other power producers (not illustrated) are connected to the network.

Further, a control system or controller 3 is provided (one controller can be used for the entire installation, or an individual controller can be provided for each wind turbine 1 or for a group of wind turbines). The controller 3 receives (for example, from an internal memory or from a remote control station) a reference value indicative of the nominal frequency ($f_n$) of the network 2, that is, of the frequency at which the network 2 should preferably operate. Typically, this frequency can be 50 Hz or 60 Hz.

Figure 2:
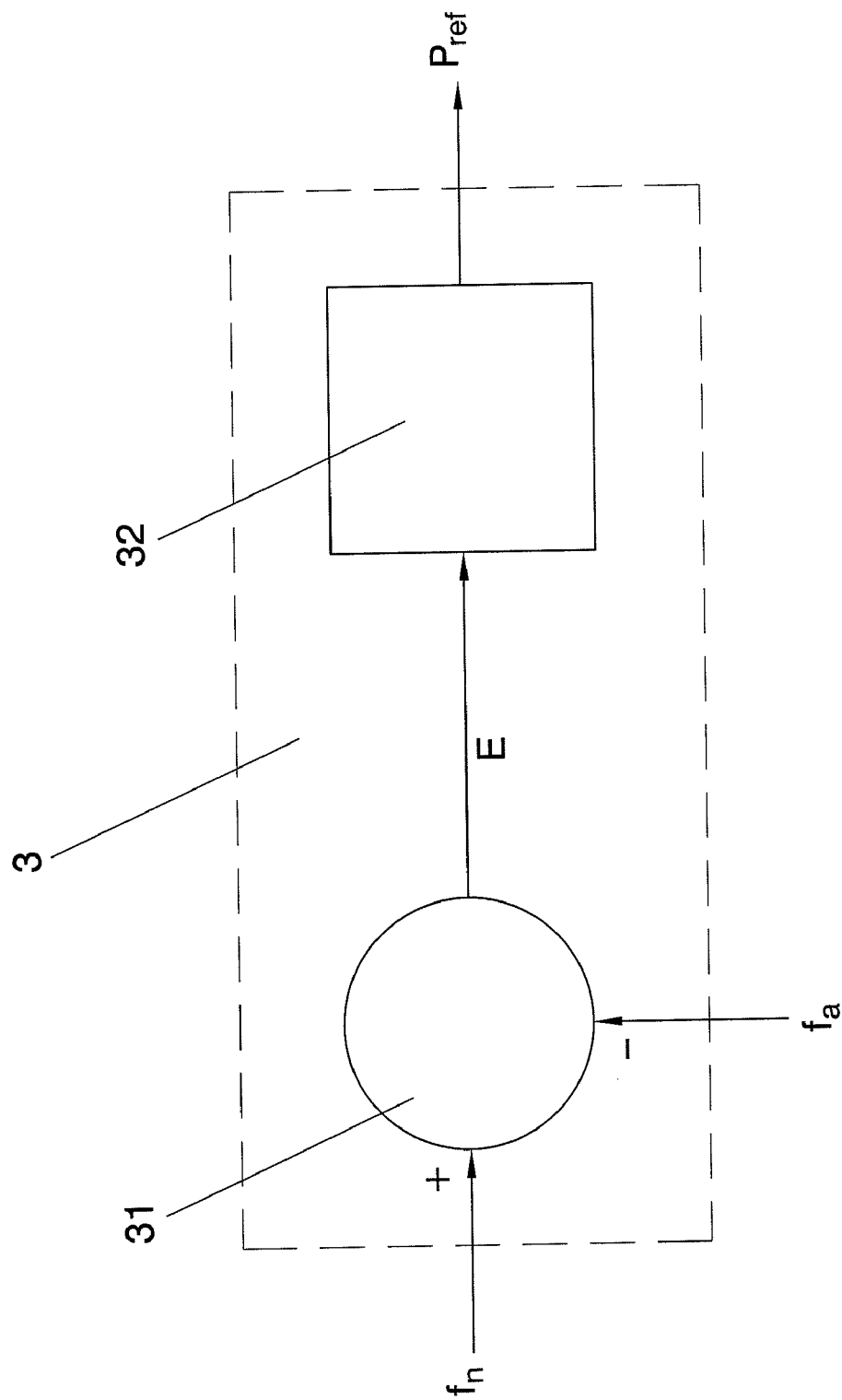
FIG. 2: A block diagram illustrating a controller 3 of a wind power installation in accordance with one possible embodiment of the invention.

Also, the controller receives a further input corresponding to a measured "actual frequency" ($f_a$) at which the network is actually operating. Obviously, this actual frequency can deviate from the nominal frequency (for example, due to an excess of injected active power or due to insufficient injected active power). The controller 3, as illustrated in FIG. 2, is designed to determine the difference E between the nominal frequency and the actual frequency (this can be done by a simple subtractor circuit 31), and to produce (by means of suitable hardware and software represented by the module 32) a power reference signal ($P_{ref}$) which determines the operation of the wind turbine(s) 1 (including its (their) converter system (s)) in a way so as to regulate the active power PA injected into the network 2 by the wind power installation, in the manner defined in the claims and described above (cf. also FIG. 3).

Figure 3:
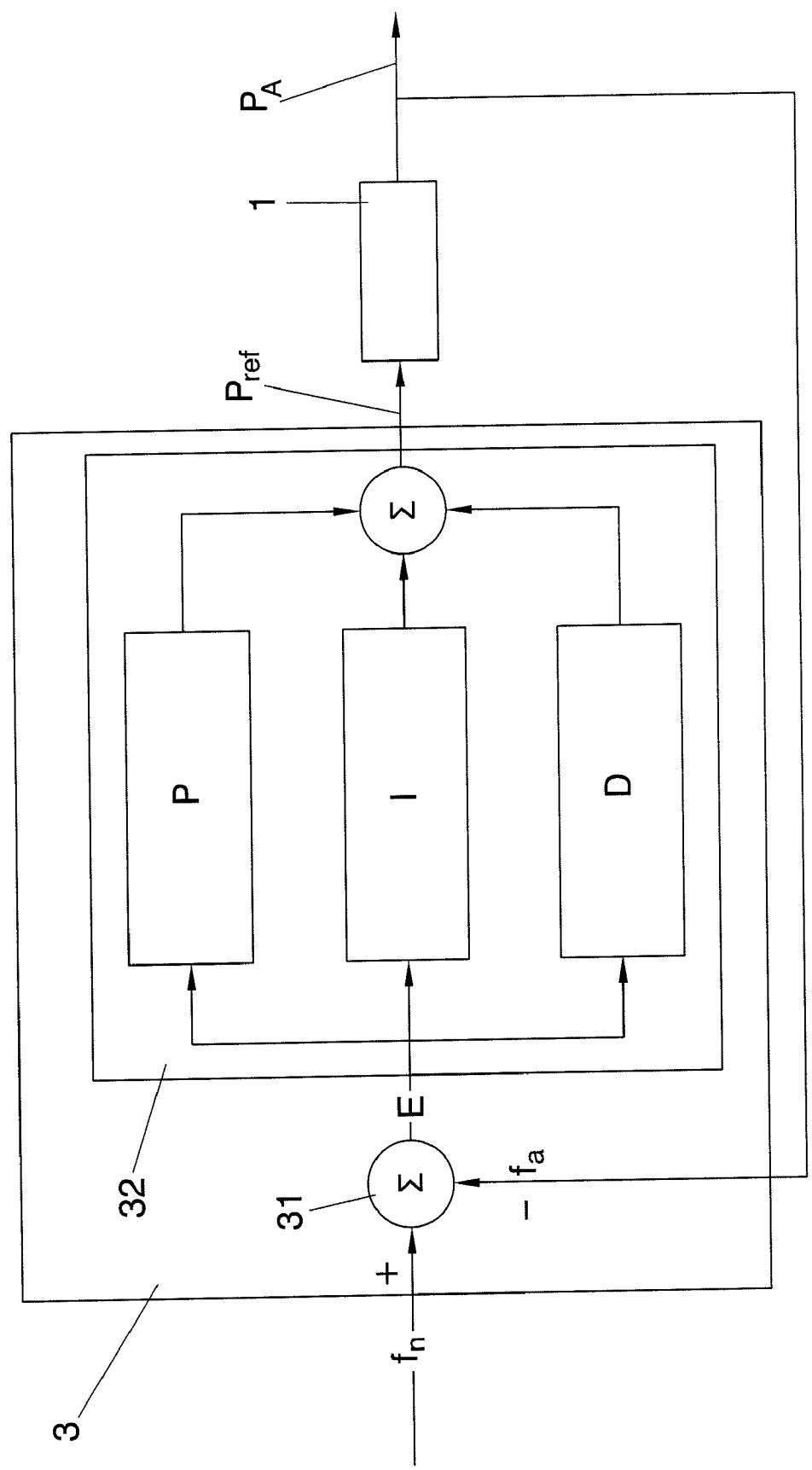
FIG. 3: A block diagram illustrating, with more detail, a possible embodiment of said controller.

The controller in accordance with one possible embodiment is illustrated with more detail in FIG. 3. It can be observed how the hardware and software module 32 comprises a P (proportional) module, an I (integral) module and a D (derivative) module, thus embodying a PID controller. The gains corresponding to the P, I and D parts can be set by the skilled person (or be set in accordance with requirements of/agreements with the system operator) in view of the specific characteristics of the system. PID control as such is well known in the art, and the skilled person will be able to set the control parameters in an adequate manner. Thus, no further description of the details of the PID (or PD, or PI, or ID, or D, or I) control is considered necessary.

Thus, the controller 32 produces the reference signal $P_{ref}$ which is taken as an input value for the control of the wind power installation 1, so as to adjust the active power P that is injected into the network accordingly.

Figure 6B:
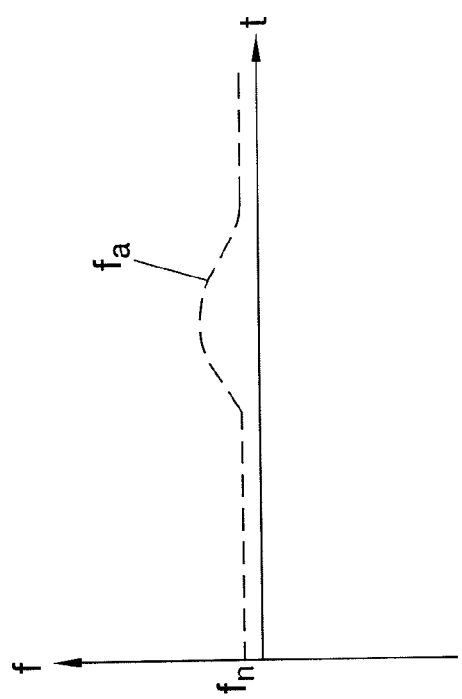
FIGS. 6A and 6B: Diagrams schematically illustrating the effect of wind turbine control involving a derivative (D) component.
Figure 6B:
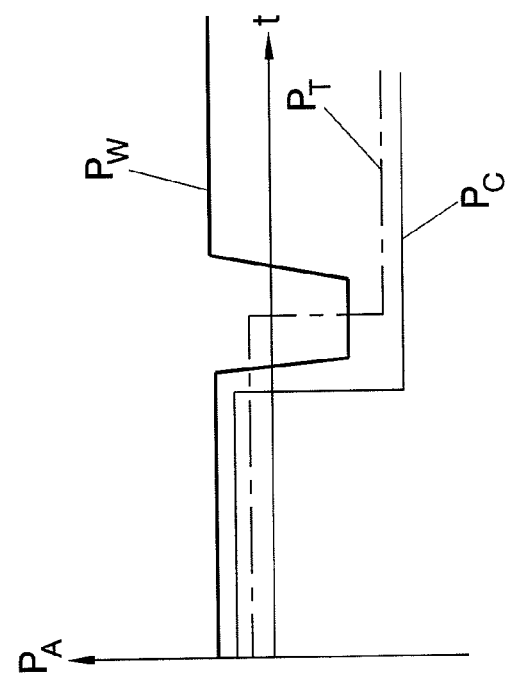
Figure 6A:
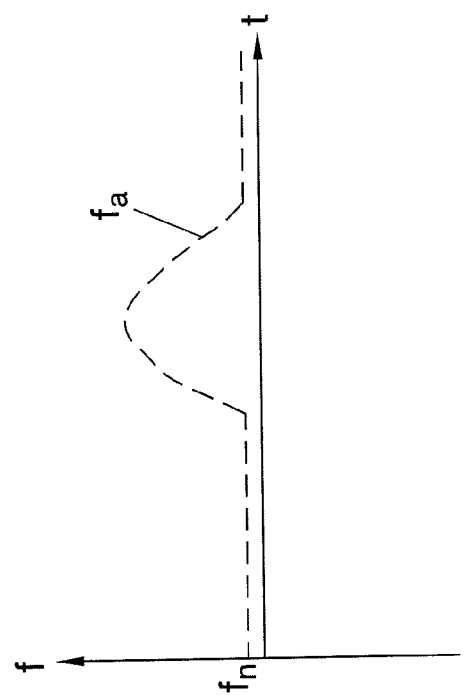
Figure 6A:
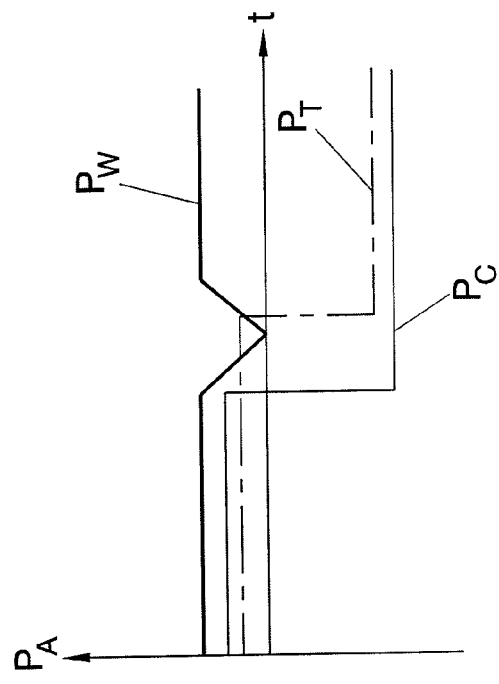

FIGS. 6A and 6B schematically illustrate the importance or effect of a derivative (D) component of the controller 32 in order to help to prevent an excessive increase in the frequency error, for example, when there is a sudden drop in the power consumed from the network.

FIG. 6A includes a frequency diagram illustrating how the actual frequency ($f_a$) varies in time (t) (the upper diagram in FIG. 6A), as a result of the variation of the power consumption ($P_C$) in the grid, the total amount of active power injected into the grid ($P_T$) from the different power suppliers connected to the grid, and the power injected from the controlled wind power installation ($P_W$) (the figures are merely schematic representations, and the "proportion" between the levels of the different curves do not correspond to any real situation), in the case of a wind power installation without a derivative control component. FIG. 6B illustrates the same elements, but for a wind power installation with an appropriately set derivate (D) control component. Thus, FIGS. 6A and 6B illustrate how a derivative control component can provide a very rapid and strong response to an increase in the frequency error, thus providing a suitable rapid and sufficient variation in the amount of injected power from the wind power installation ($P_W$), thereby reducing the maximum level of the frequency error (the maximum level of the frequency error is much lower in FIG. 6B than in FIG. 6A).

Figure 4:
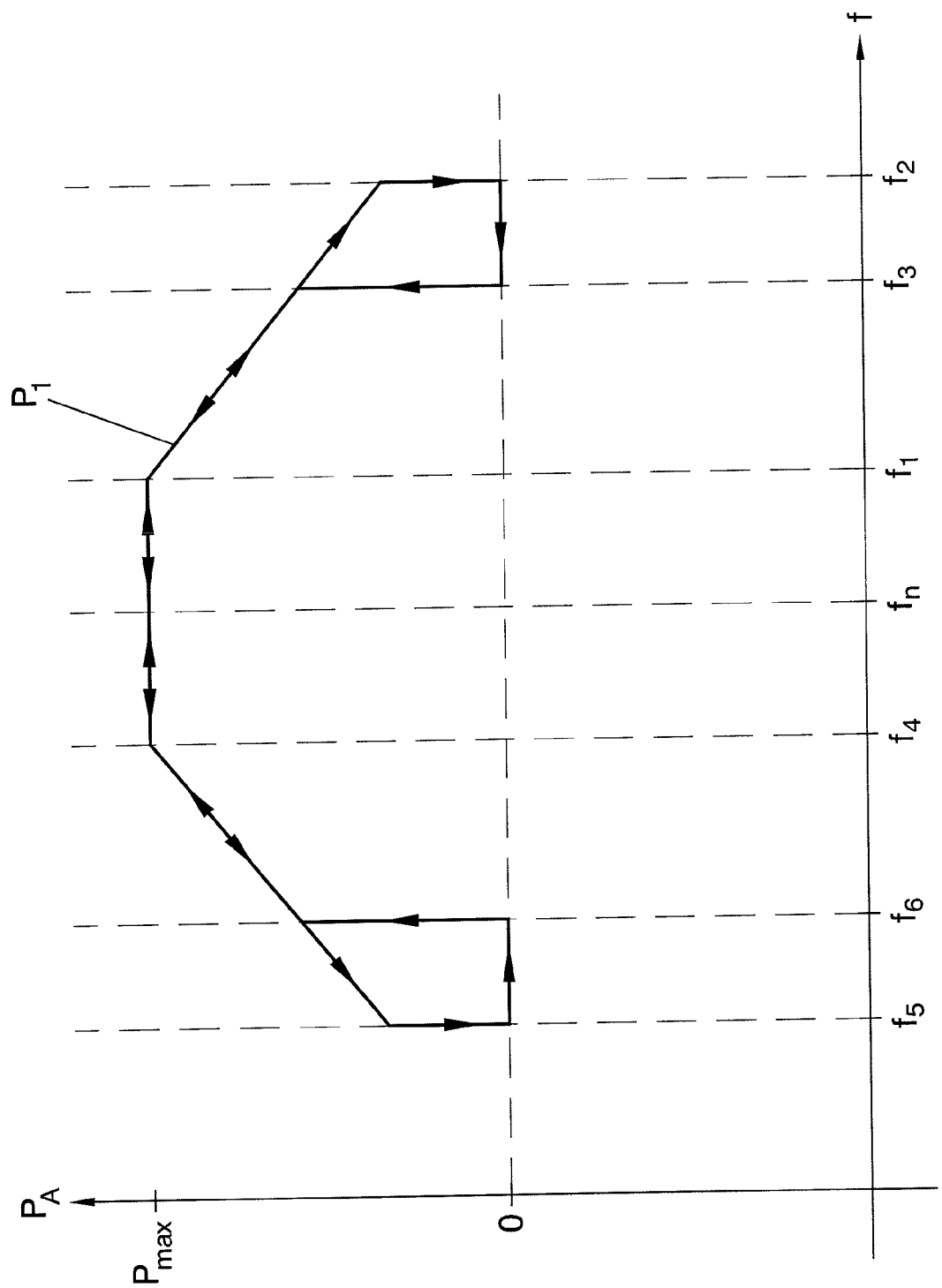
FIG. 4: A diagram schematically illustrating the power supplied to the grid by a wind power installation operated in accordance with one possible embodiment of the invention.

The control module 32 can additionally or alternatively be configured to implement hysteresis. For example, as illustrated in FIG. 4 (the curve $P_1$ represents the way the active power injected into the grid from a wind power installation varies in accordance with the actual network frequency), the control module can be configured to control the active power $P_A$ that is injected into said network from said wind power installation in view of the measured actual network frequency ($f_a$) at which the network is operating, by reducing the amount of active power injected into the network (for example, from a level $P_{max}$ corresponding to a maximum amount of active power that can be generated and output from the wind power installation), as a function of the actual network frequency (that is, in accordance with "rules" based on said actual network frequency, as mentioned above), if said actual network frequency increases beyond a first upper network frequency threshold value ($f_1$) (which could correspond to, for example, 50.2 Hz), and stopping injection of active power into the network if said actual network frequency increases beyond a second upper network frequency threshold value ($f_2$) higher than said first upper frequency threshold value ($f_1$).

Further, the control module 32 can be configured such that once said actual network frequency has increased beyond said second upper network frequency threshold value ($f_2$) (this second upper network frequency threshold value ($f_2$) can, for example, be 51.5 Hz), injection of active power into the network is not resumed until the actual network frequency has decreased below a third upper frequency threshold value ($f_3$) lower than said second upper frequency threshold value ($f_2$). That is, if $f_1$=50.2 Hz and $f_2$=51.5 Hz, $f_3$ could be set to a value slightly below 51.5 Hz, such as at 51.2 or 51.0 Hz. By using this third upper frequency threshold value, it is achieved that injection of active power does not resume until the actual network frequency has decreased sufficiently below the second upper frequency threshold value, so as to "guarantee" or at least make it likely that a restart of the injection of active power will not immediately "push" the network frequency upwards beyond the second upper frequency threshold value. Thus, "oscillations" in the on/off status of the injection of active power can be avoided, which can serve to increase the stability of the system.

Further, as illustrated in the left part of FIG. 4, the control module 32 can further be configured so as to—reduce the active power injected into the network, as a function of the actual network frequency, if said actual network frequency decreases below a first lower network frequency threshold value ($f_4$) (which could be, for example, 49.8 Hz), and stop injection of active power into the network if said actual network frequency decreases below a second lower network frequency threshold value ($f_5$) lower than said first lower frequency threshold value ($f_4$), and further so as to, once said actual network frequency has decreased below said second lower network frequency threshold value ($f_5$) (which can be, for example, 47.5 Hz), not resume injection of active power into the network until the actual network frequency has increased beyond a third lower frequency threshold value ($f_6$) higher than said second lower frequency threshold value ($f_5$). Thus, "oscillations" in the on/off status of the injection of active power can be avoided also in the range of frequencies lower than the nominal network frequency, which can serve to further increase the stability of the system.

As an alternative, the control module can be configured to increase (instead of reducing) the amount of active power injected into the network, as a function of the actual network frequency (and as long as such an increase is possible in view of the output limitations of the wind power installation), if said actual network frequency decreases below a first lower network frequency threshold value ($f_4$), until, for example, said actual network frequency sinks below the second lower frequency threshold value ($f_5$). Once below said second lower frequency threshold value, the injected active power can, for example, be kept constant, or be reduced, or be further increased, or even be set to zero, depending on grid codes or on the preferences of the operator of the network or the operator of the wind power installation. For example, in accordance with one possible embodiment, the control module can be configured to stop injection of active power into the network if said actual network frequency decreases below said second lower network frequency threshold value ($f_5$) lower than said first lower frequency threshold value ($f_4$), and further be configured so that, once said actual network frequency has decreased below said second lower network frequency threshold value ($f_5$), injection of active power into the network is not resumed until the actual network frequency has increased beyond a third lower frequency threshold value ($f_6$) higher than said second lower frequency threshold value ($f_5$).

Figure 5:
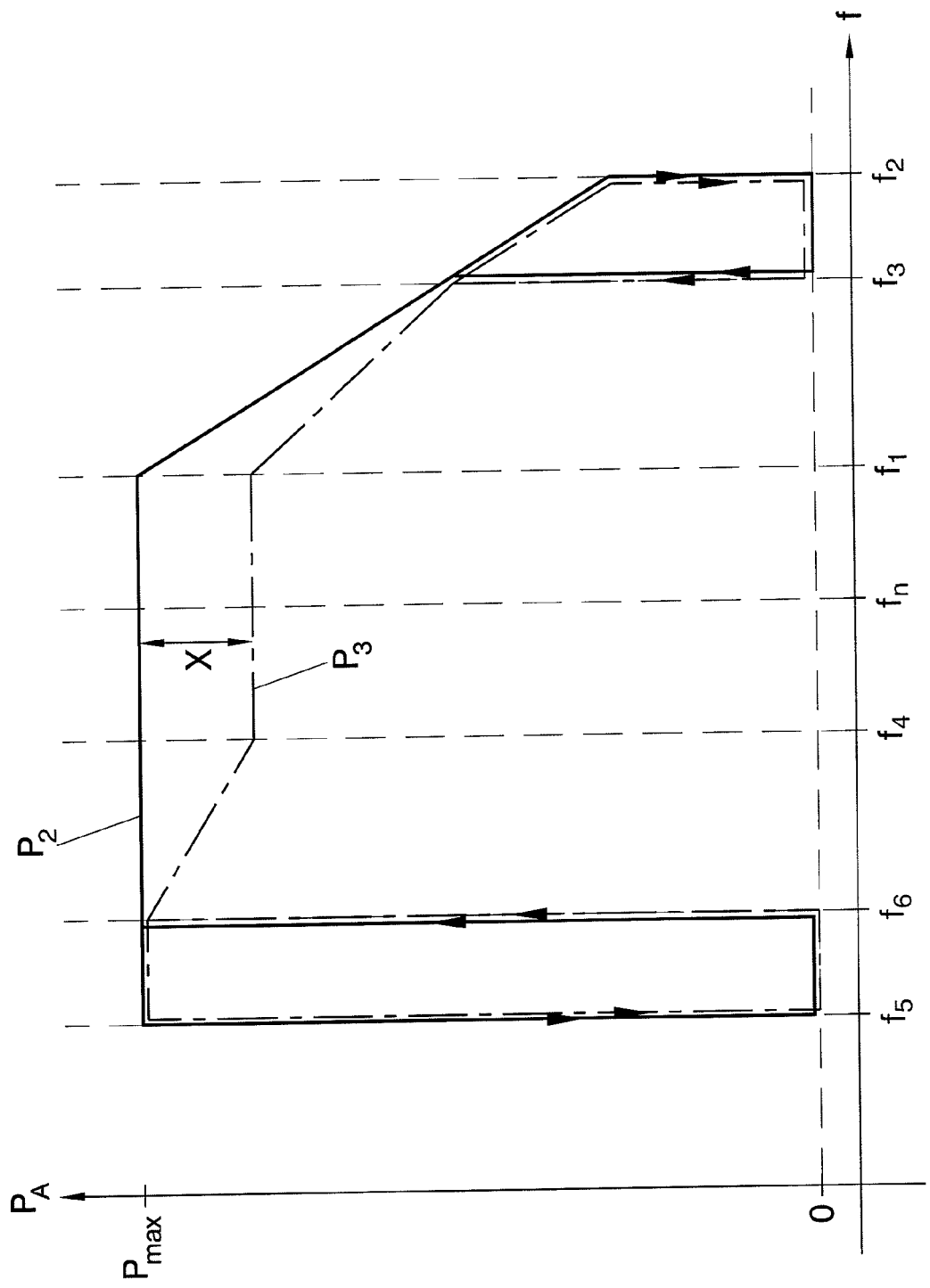
FIG. 5: A diagram schematically illustrating the power supplied to the grid by a wind power installation operated in accordance with two other possible embodiments of the invention.

FIG. 5 illustrates two such possible embodiments of the invention. In a first one, corresponding to the power curve $P_2$, the power injected into the network from the wind power installation is at the maximum level $P_{max}$ when the actual network frequency corresponds to the nominal network frequency $f_n$. When the actual network frequency increases beyond $f_1$, power injection is reduced, and finally stopped when the frequency increases beyond $f_2$, not to be resumed again until the frequency has decreased below $f_3$, just as described in connection with FIG. 4.

However, the difference compared to the $P_1$ embodiment is that in accordance with the $P_2$ embodiment, the injected power is not decreased when the actual frequency sinks below $f_4$; instead, the maximum available active power is continued to be injected into the grid, until the actual frequency sinks below $f_5$, in which case power injection is stopped, not to be resumed again until the frequency rises above $f_6$.

A further embodiment is illustrated by the power curve $P_3$, similar to $P_2$ but with the difference that at network frequencies at $f_n$ and up until $f_1$, the amount of active power injected into the network is not the maximum power that could be supplied by the wind power installation, but a lower amount of active power, reduced by an amount X which constitutes a so-called "power reserve" or "spinning reserve". This makes it possible to increase the amount of active power when the actual network frequency sinks below the first lower network frequency threshold value $f_4$, until the maximum $P_{max}$ is reached, as shown in FIG. 5 (also here, injection can be stopped at $f_5$ and resumed at $f_6$). In this way, the arrangement helps to further stabilise the system, as the insufficient injection of active power that caused the decrease of the actual network frequency can be at least partly compensated by the "power reserve".

In under-frequency situations, the frequently employed reduction of the injected active power is often basically related to internal limitations in the turbine. However, from a system/grid point of view, when the actual frequency in the grid sinks below the desired value, it can be better to increase the amount of active power injected into the grid. Of course, this requires some kind of "power reserve" in the wind turbine, that is, a capacity to produce and inject into the grid more active power than what was previously produced.

Figure 7A:
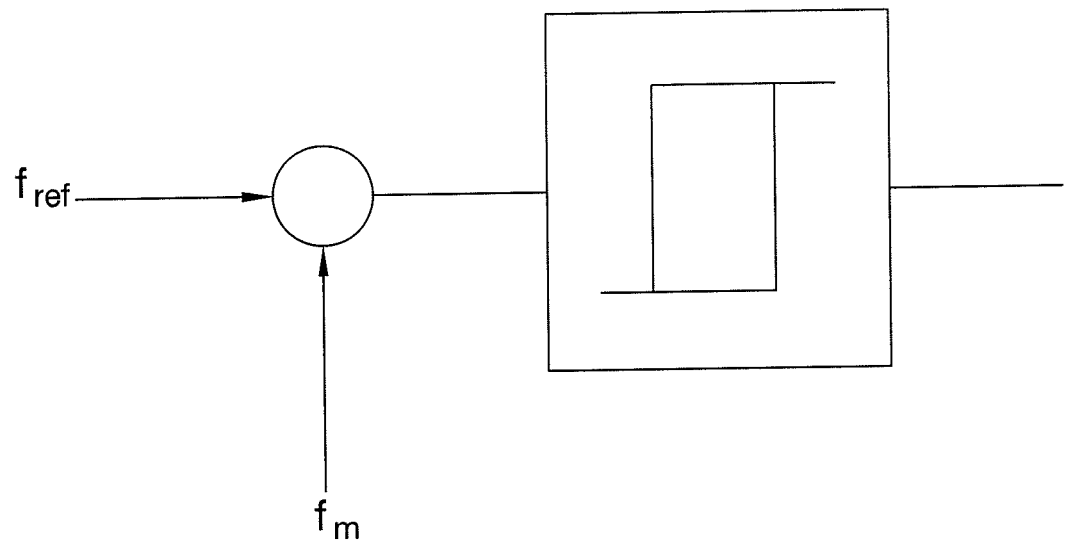
FIGS. 7A and 7B: Diagrams schematically illustrating two basic controller concepts that can be useful to implement different embodiments of the invention.
Figure 7B:
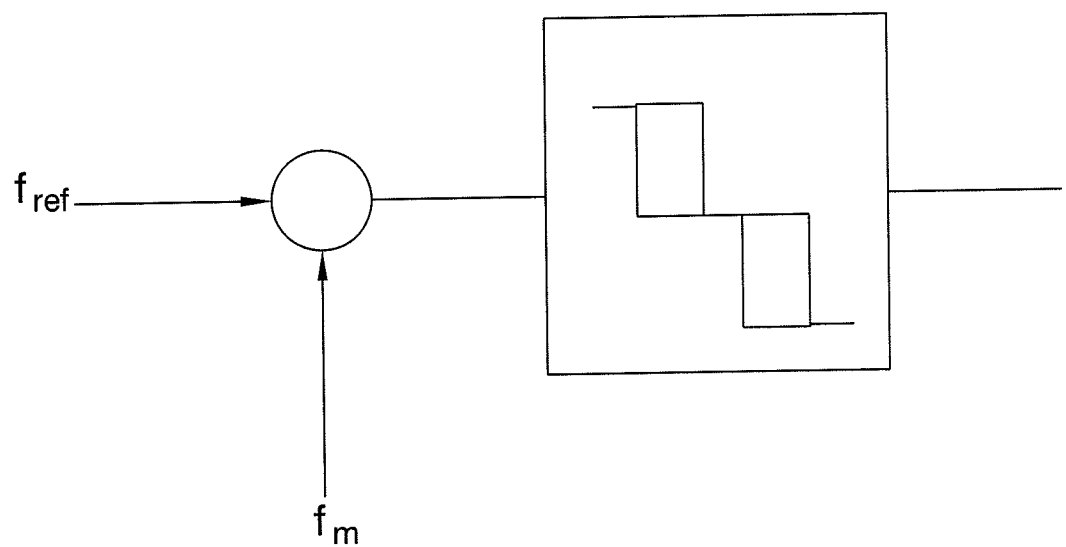

FIGS. 7A and 7B schematically illustrate two basic controller concepts that can be useful to implement different embodiments of the invention. In FIG. 7A, a two-level hysteresis controller is illustrated, with a first input signal $f_{ref}$ (that could correspond to a "desired" value of, for example, a frequency, such as the nominal frequency $f_n$ referred to above) and a second input signal $f_m$ (which could be a measured "real" value of a frequency, such as the actual grid frequency $f_a$ referred to above), and an output signal which can have two different levels (for example, "0" or "1"), whereby the level of the output signal depends on the difference between the two input signals.

FIG. 7B illustrates a similar concept, but with an output signal that can have three different levels, such as "−1", "0" and "1".

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method of operating a wind power installation connected to a network for distribution of electrical power, said wind power installation comprising at least one wind power generator, said wind power installation being related to said network for injection of power into said network, said network having a nominal network frequency ($f_n$) and said network being arranged for operating at the nominal network frequency, wherein said method comprises controlling the active power that is injected into said network from said wind power installation in view of a measured actual network frequency ($f_a$) at which said network is operating, said method comprising the steps of:
    measuring the actual network frequency ($f_a$); and
    determining a difference (E) between the actual network frequency ($f_a$) and the nominal network frequency($f_n$);
    said method further comprising the step of, if said difference (E) is larger than a predefined threshold, adapting by means of a controller the amount of active power that is injected into said network from said wind power installation, in a manner that depends on a magnitude of the difference (E), a duration of the difference (E), and a rate of change of the controller output so as to bring the actual network frequency ($f_a$) back towards the nominal network frequency ($f_n$).

2. Method according to claim 1, wherein the active power that is injected into said network is adapted using said controller involving at least an integration over time of the difference (E) between the actual network frequency ($f_a$) and the nominal network frequency ($f_n$).

3. Method according to claim 2, wherein said controller is a PI controller.

4. Method according to claim 2, wherein said controller is a PID controller.

5. Method according to claim 2, wherein said controller is an I controller.

6. Method according to claim 2, wherein said controller is an ID controller.

7. Method according to claim 1, wherein the active power that is injected into said network is adapted using said controller involving at least a time derivative of the difference (E) between the actual network frequency ($f_a$) and the nominal network frequency ($f_n$).

8. Method according to claim 7, wherein said controller is an ID controller.

9. Method according to claim 7, wherein said controller is a PID controller.

10. Method according to claim 7, wherein said controller is a D controller.

11. Method according to claim 7, wherein said controller is a PD controller.

12. A method of operating a wind power installation connected to a network for distribution of electrical power, said wind power installation comprising at least one wind power generator, said wind power installation being related to said network for injection of power into said network, said network having a nominal network frequency ($f_n$) and said network being arranged for operating at said nominal network frequency, wherein said method comprises controlling the active power that is injected into said network from said wind power installation in view of a measured actual network frequency ($f_a$) at which the network is operating, said method comprising the steps of
    reducing the active power injected into said network, as a function of the actual network frequency, if the actual network frequency increases beyond a first upper network frequency threshold value ($f_1$); and
    stopping injection of active power into said network if the actual network frequency increases beyond a second upper network frequency threshold value ($f_2$) higher than the first upper frequency threshold value ($f_1$),
    wherein
    once the actual network frequency has increased beyond the second upper network frequency threshold value ($f_2$), injection of active power into said network is not resumed until the actual network frequency has decreased below a third upper frequency threshold value ($f_3$) lower than the second upper frequency threshold value ($f_2$).

13. Method according to claim 12, wherein said method further comprises the steps of:
    reducing the active power injected into said network, as a function of the actual network frequency, if the actual network frequency decreases below a first lower network frequency threshold value ($f_4$); and
    stopping injection of active power into said network if the actual network frequency decreases below a second lower network frequency threshold value ($f_5$) lower than the first lower frequency threshold value ($f_4$), wherein, once the actual network frequency has decreased below the second lower network frequency threshold value ($f_5$), injection of active power into said network is not resumed until the actual network frequency has increased beyond a third lower frequency threshold value ($f_6$) higher than the second lower frequency threshold value ($f_5$).

14. Method according to claim 12, wherein said method further comprises the step of increasing the active power injected into said network, as a function of the actual network frequency, if the actual network frequency decreases below a first lower network frequency threshold value ($f_4$).

15. Method according to claim 14, further comprising the step of stopping injection of active power into said network if the actual network frequency decreases below a second lower network frequency threshold value ($f_5$) lower than the first lower frequency threshold value ($f_4$), wherein, once the actual network frequency has decreased below the second lower network frequency threshold value ($f_5$), injection of active power into said network is not resumed until the actual network frequency has increased beyond a third lower frequency threshold value ($f_6$) higher than the second lower frequency threshold value ($f_5$).

16. Method of claim 12, further comprising the method of operating a wind power installation connected to a network for distribution of electrical power, said wind power installation comprising at least one wind power generator, said wind power installation being related to said network for injection of power into said network, said network having a nominal network frequency ($f_n$) and said network being arranged for operating at the nominal network frequency, wherein said method comprises controlling the active power that is injected into said network from said wind power installation in view of a measured actual network frequency ($f_a$) at which said network is operating, said method comprising the steps of:

measuring the actual network frequency ($f_a$); and
determining a difference (E) between the actual network frequency ($f_a$) and the nominal network frequency ($f_n$),
said method further comprising the step of, if the difference is larger than a predefined threshold, adapting the amount of active power that is injected into said network from said wind power installation, in a manner so as to bring the actual network frequency ($f_a$) back towards the nominal network frequency ($f_n$).

17. Wind power installation arranged to be connected to a network for distribution of electrical power, said wind power installation comprising at least one wind power generator, said wind power installation being related to said network for injection of power into said network, wherein said wind power installation comprises a control system arranged for controlling the injection of active power into said network depending on the magnitude of the difference (E), the duration of the difference (E), and the rate of the change of the controller output in accordance with the method of claim 1.

* * * * *